April 16, 1940.  W. H. THEDFORD ET AL  2,197,371
NAILING MACHINE
Filed Nov. 19, 1938   8 Sheets-Sheet 2

Fig. 2

INVENTORS
W. H. Thedford and W. F. Harriett
BY Conrad A. Dieterich
their ATTORNEY.

April 16, 1940. W. H. THEDFORD ET AL 2,197,371
NAILING MACHINE
Filed Nov. 19, 1938 8 Sheets-Sheet 4

Fig. 7

INVENTORS
W. H. Thedford and W. F. Harriett
BY Conrad A. Dietrich
their ATTORNEY.

April 16, 1940.  W. H. THEDFORD ET AL  2,197,371
NAILING MACHINE
Filed Nov. 19, 1938   8 Sheets-Sheet 5

INVENTORS
W. H. Thedford and W. F. Harriett
BY Conrad A. Dieterich
their ATTORNEY.

Patented Apr. 16, 1940

2,197,371

UNITED STATES PATENT OFFICE 2,197,371

NAILING MACHINE

William H. Thedford, North Tarrytown, and William F. Harriett, Woodhaven, N. Y., assignors to William S. Doig Inc., Brooklyn, N. Y., a corporation of New York Application November 19, 1938, Serial No. 241,374

13 Claims. (Cl. 1—8.1)

The invention relates to improvements in nailing machines, and the same has for its object to provide a simple, efficient and reliable machine which is capable of operating at an output rate substantially greater than that obtainable with machines utilizing the ordinary manual methods for variously positioning the work with relation to the nailing mechanism.

Further, said invention has for its object to provide a nailing machine which is capable of performing a succession of nailing operations upon the work as the work is fed or advanced along a single line of direction through the machine.

Further, said invention has for its object to provide a nailing machine which obviates the need for manually turning the box member or work piece several times in order to present its several sides or intermediate portions successively to the nailing mechanism in order to receive nails along the several sides or intermediate portions thereof.

Further, said invention has for its object to provide a nailing machine which is capable of performing a succession of nailing operations upon each of a series of box sides or panels while said sides or panels with the parts thereof in assembled relation are advanced or fed through the machine upon a constantly moving conveyor.

Further, said invention has for its object to provide a nailing machine in which means are provided for preventing the advance of the work and for causing the operation of the nailing mechanism as each piece of work attains each of its successive positions to be nailed.

Further, said invention has for its object to provide a nailing machine in which the nailing mechanism, upon each actuation thereof by the advance of the work, is automatically stopped at the completion of its said operation.

Further, said invention has for its object to provide a nailing machine in which the nailing mechanism control means is actuated by means operating in accordance with the movement of the work into position to be operated upon.

Further, said invention has for its object to provide a nailing machine in which said actuating means are carried by the frame or holder serving to hold or retain the work with the parts thereof in assembled positions.

Further, said invention has for its object to provide a nailing machine in which said actuating means are disposed along said frame or holder at positions corresponding to those at which the work is to be nailed.

Further, said invention has for its object to provide a nailing machine in which the work conveying means is operated continuously at uniform speed while the work is supported thereon and advanced by said conveying means by the frictional engagement of the work therewith.

Further, said invention has for its object to provide a nailing machine in which the control means for the nailing mechanism, and the actuating means moving with the work cooperate to prevent movement of the work with the conveyor when the work attains each of its successive nailing positions.

Further, said invention has for its object to provide a nailing machine in which the nailing mechanism, upon operation thereof, serves to reset the control means and to prevent movement of the work while in position upon the moving conveyor until the nailing operation is completed.

Further, said invention has for its object to provide a nailing machine in which the control means upon resetting thereof clears the work to allow further advance thereof by the conveyor after each release of the work by the nailing mechanism.

Further, said invention has for its object to provide a nailing machine in which the conveying means is in two separated cooperating sections disposed respectively in advance of, and to the rear of the work-supporting table and clinching anvil so as to permit of the due operation of the nailing mechanism.

Further, said invention has for its object to provide a nailing machine in which the width of the work conveying and guiding means is adjustable to accommodate work of different widths.

Further, said invention has for its object to provide a nailing machine in which the conveying means is associated with a vertically adjustable work-supporting table and clinching anvil and is vertically adjustable therewith so as to maintain the conveyor substantially horizontal and substantially flush with the surface of said table in the various adjusted positions thereof.

Other objects will in part be obvious and in part be pointed out hereinafter.

To the attainment of the aforesaid objects and ends our invention consists in the novel features of construction, and in the combination, connection and arrangement of parts hereinafter more fully described and then pointed out in the claims.

In the accompanying drawings—

In said drawings, the machine is shown comprising a frame 10 including vertical side members 11 supporting at their upper ends a transverse member 12 carrying the selective nail feeding mechanism 13. A cross-head 14 is slidably mounted on the edge 15 of the frame 10, and is adapted to be reciprocated vertically through pitmans 16, each having one end pivotally connected to one end of the cross-head 14, and its other end connected to a crank 17 actuating from the main driving shaft 18 of the machine. Power is transmitted to the shaft 18 from the motor shaft 19 through a train of gears 20, including a gear 21 adapted to be automatically clutched to the shaft 18 upon the initiation of each nailing operation, as hereinafter more fully described. The nail feeding means and selective mechanism 13 are actuated from the cross-head 14 though a link connection 22 while the nail hopper or box 23 is agitated by the mechanism including the link connection 24 reciprocated by a crank operated from the gear transmission 20.

Figures 15, 16, 17, 18:
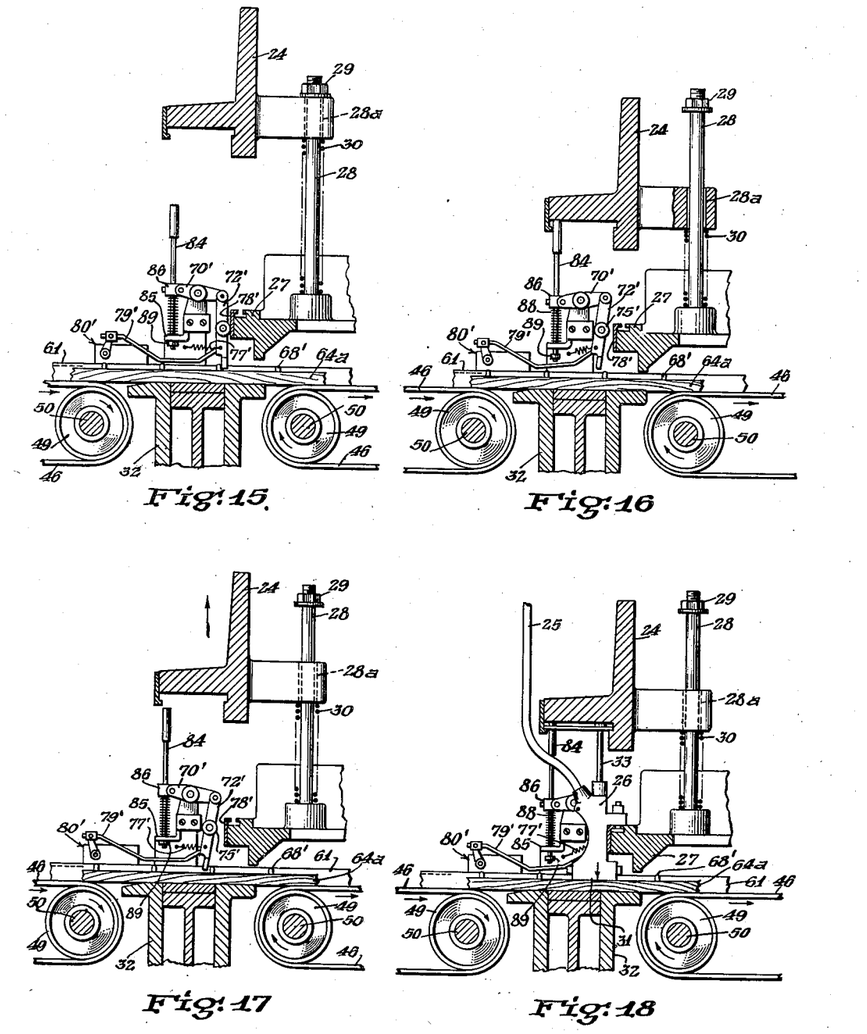
Fig. 15 is a detail side elevation of the control means showing the same in switch actuating position, parts of the machine being shown in section and parts being omitted.
Fig. 16 is a similar view showing the cross-head of the machine in lowered position, and the control means in reset position.
Fig. 17 is a similar view showing the cross-head returning to its elevated position.
Fig. 18 is a similar view showing the cross-head in lowered position, and the chucks pressing the work and holding it against movement with the conveyor.

The nails are fed from the selective feeding mechanism 13 in predetermined order, according to the selector setting, through the flexible nail feed tubes 25 which are connected at their lower ends to the nail chucks 26 secured upon the chuck carriage 27 in transversely spaced apart relation. The chuck carriage 27 depends from the cross-head 14, and is slidably connected thereto by the rods 28 extending through openings 28ᵃ in the cross-head, and having heads 29 at the upper ends thereof. A coil spring 30 is interposed between the carriage 27 and the cross-head 14 about each rod 28. The rods 28 are of such length that when the cross-head is in its uppermost position, the bottoms 31 of the several chucks 26 will be raised out of engagement with the work disposed upon the table or clinching anvil 32 below the chucks. Upon descent of the cross-head 14, as shown in Fig. 18, the chucks 26 become free to engage the work before the nailing operation occurs, and the cross-head moves relative to the rods 28 to compress the spring 30 and imposed a substantial pressure upon the work, for the purpose hereinafter more fully described. The nailing operation is effected by means of the plungers 33 extending into the chucks 26 and connected at their upper ends to the cross-head 14 to be actuated thereby.

In the machine embodying the present invention, the work is preferably advanced or fed through the machine into and from nailing position in a single line of direction by continuously operated conveying means 34, thereby obviating the need for manually turning the box member or panel several times in order to present its several sides, or intermediate portions, successively to the nailing mechanism to receive nails along the sides or intermediate portions.

The conveying means 34 is preferably in two sections 35 and 36 disposed respectively at opposite sides of the table 32. The table 32, in accordance with the usual practice, is capable of a slight vertical adjustment to accommodate work of various thicknesses, as by means of the adjusting mechanism 32ᵃ. Each of the conveyor sections 35, 36, comprises a supporting frame including the parallel angle members 37 and 38 secured at their inner ends to the lower edges of the outwardly directed bearing brackets 39 and 40, preferably formed integrally with the outer ends of said table 32. The members 37 and 38 are secured at the opposite ends thereof to the brackets 41 and 42, which are supported by vertically adjustable uprights or standards 43 and 44 resting upon the floor and connected rotatably at the upper ends thereof to said brackets 41 and 42. The brackets 41 and 42 are connected or bridged by a transverse guide shaft 45.

The conveying means 34 at each side of the table 32 preferably comprises a pair of endless conveyor belts 46 and 47 arranged in parallel spaced relation, and adapted to be relatively adjusted toward and away from each other in accordance with the width of the work to be operated upon. Each of the belts 46 at the outer end thereof is disposed about an idler pulley 48 journaled in the bracket 42, and at the inner end thereof is disposed about a pulley 49 keyed to the transverse drive shaft 50, adjustably journaled, as hereinafter described, in the brackets 39 and 40 extending from the table 32. Each of the belts 47 is mounted for adjustment toward and away from the corresponding belt 46. For this purpose the belt 47 at the outer end thereof is disposed about an idler pulley 51 journaled in a member 52 adapted to slide along the shaft 45.

Figure 1:
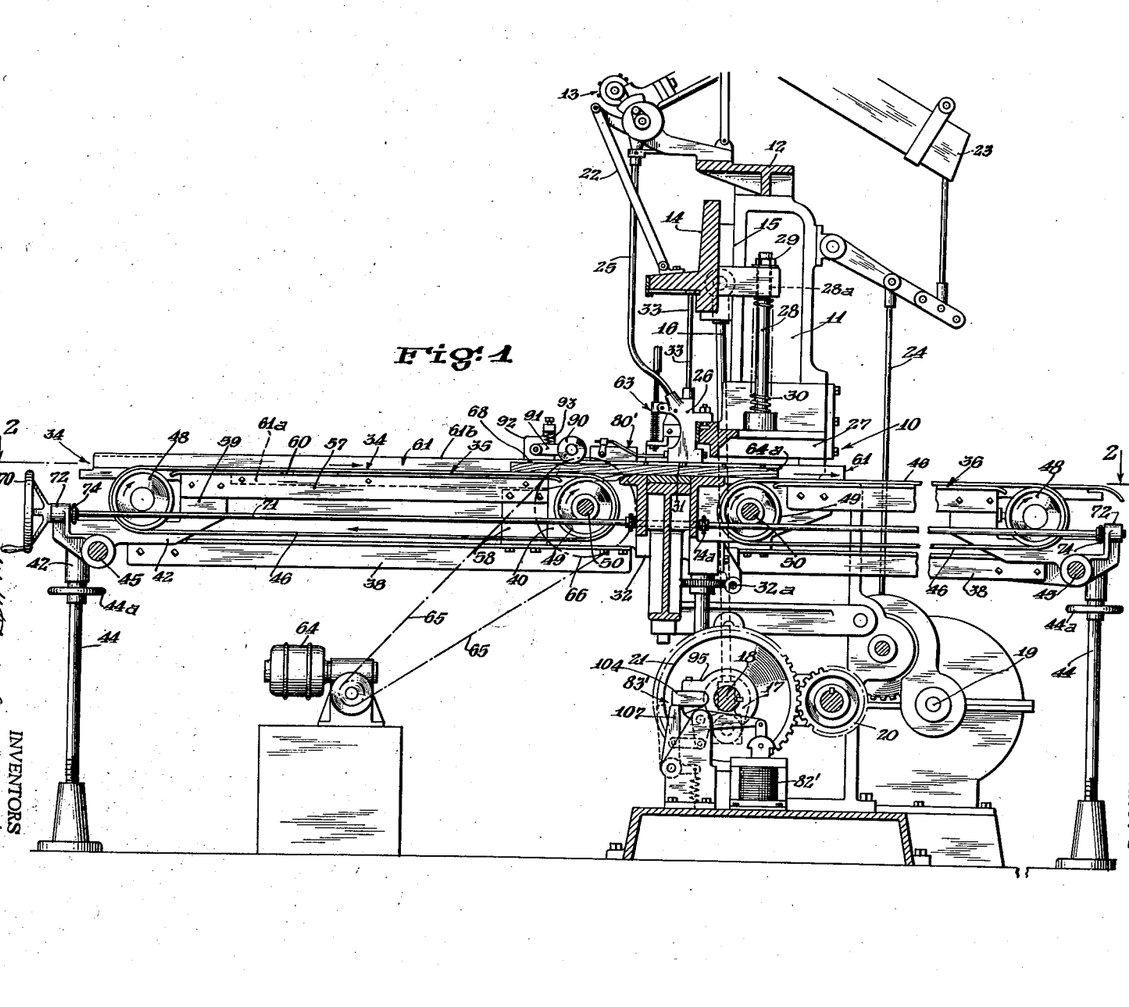
Figure 1 is a side elevation with parts in section illustrating one form of nailing machine constructed according to and embodying the said invention.
Figure 2:
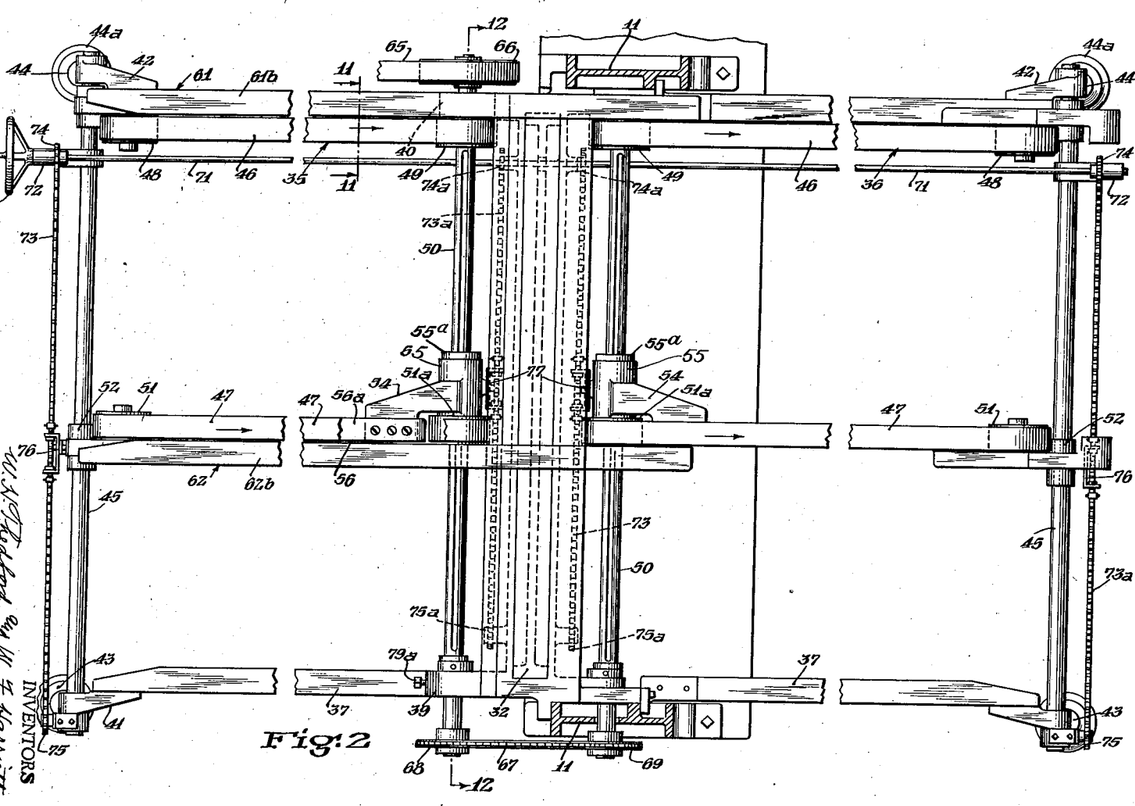
Fig. 2 is a plan view of the work conveying means of said machine.
Figure 12:
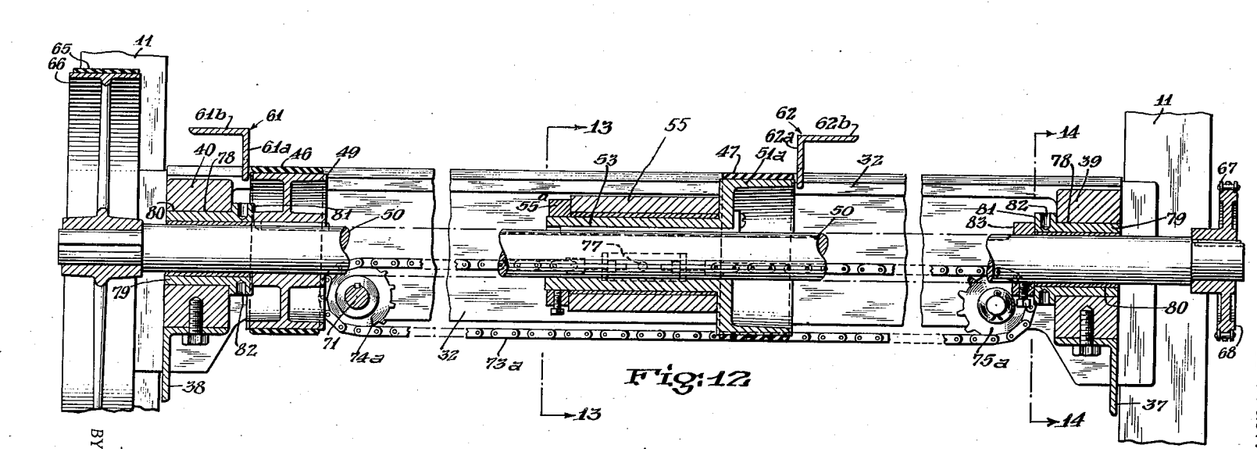
Fig. 12 is a transverse section on the line 12—12 of Fig. 2.
Figure 13:
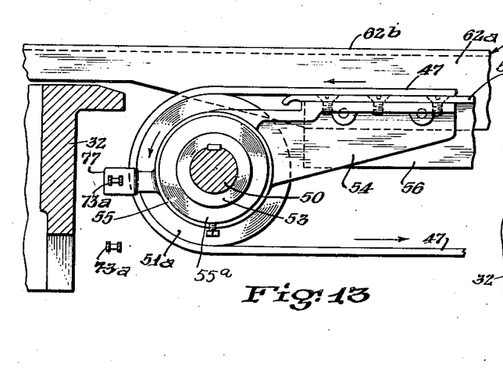
Fig. 13 is a detail section on the line 13—13 of Fig. 12.

The belt 47 is disposed at the inner end about a pulley 51ª keyed to the shaft 50 for sliding movement axially thereof, as more clearly shown in Figs. 2, 12 and 13. The pulley 51ª includes a lateral hub or sleeve portion 53 embracing the shaft 50. A bracket 54 is freely supported in position upon the sleeve 53 by means of the hub 55 embracing said sleeve 53. The bracket 54 is retained by the collar 55a in position upon the sleeve 53 so as to slide axially with the latter, and is held against rotation with the pulley 51ª and sleeve 53 by means of the angular member 56 which is connected at one end to said bracket 54, and at its opposite end to the sliding bracket or member 52. The member 56 is disposed immediately below the upper run of the belt 47 so that the horizontal flange 56ª of said member 56 serves as a support or rest for the belt. The belt 46 is supported in like manner by an angular member 57 having its vertical side at one end connected to an upright 58 supported by the member 38, and at its opposite end connected to an upwardly extending portion 59 of the bracket 42, the upper run of the belt 46 being supported by the horizontal flange 60 of said member 57. Angle members 61 and 62 extend longitudinally of the forward conveyors 46 and 47 at the outer sides thereof to form guides for the work traveling with the conveyor, said guides projecting above the upper surfaces of the conveyors. The vertical flange 61ª of the member 61 is preferably secured to the vertical face of the angular conveyor support 57 so that the horizontal flange 61ᵇ of said member 61 may serve as a support for control mechanism 63, as hereinafter described. In like manner, the angular guide 62 is secured by its vertical flange 62ª to the vertical portion of the conveyor support 56 so that the horizontal flange 62ᵇ may also serve as a support for such control mechanism, if so desired. The guide 62 is thus made laterally adjustable with the conveyor 47. Preferably, the angular guides 61 and 62 extend over the table 32 and along the conveyors 46 and 47 at the discharge side of the machine for a distance sufficient to insure continued guidance of the work until the nailing operations thereon are completed. As shown more clearly in Fig. 13, the vertical flange 62ª, and also flange 61ª, are of reduced depth above the table 32 to provide clearance thereover.

The forward and rear pairs of conveyors 46 and 47 are preferably continuously driven to feed the work carried thereby in the direction of the arrows by means of a separate motor 64 operatively connected by a belt or other transmission means 65 with a pulley or drum 66 secured to the forward shaft 50 at one end thereof. Power is transmitted to the conveyor section 36 at the discharge side of the machine by means of a chain belt 67, or other form of transmission, disposed about the sprockets 68 and 69 secured to the contiguous ends of the two shafts 50 at the other side of the machine.

Both the forward and rear conveyors 47 may be simultaneously and correspondingly adjusted relative to the conveyors 46 by a single manual control 70, such as a wheel secured to one end of a shaft 71 rotatably supported in bearings 72 upon the forward and rear guide shafts 45, said shaft 71 extending longitudinally of the machine at one side thereof below the table 32.

The forward and rear slidable supports 52, 54 for the conveyor belts 47 are adjusted laterally relative to the conveyor belt 46 by a plurality of transversely extending chain belts 73, 73ª disposed at one side of the conveyor frame about sprockets 74, 74ª keyed to the actuating shaft 71 at longitudinally spaced points therealong, and disposed at the opposite side of the conveyor frame about idler sprockets 75, 75ª mounted on the conveyor frame at corresponding points longitudinally thereof. The chain belts 73, which are disposed at the front and the rear of the conveyor frame, are respectively connected at 76, preferably at points on the upper runs thereof, to the slidable members 52, while the chain belts 73ª, which are disposed at opposite sides of the table 32, are similarly connected at 77 to the slidable members 54.

Figure 14:
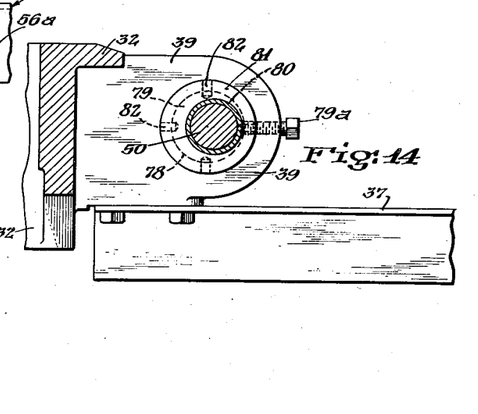
Fig. 14 is a detail section on the line 14—14 of Fig. 12.

Each of the shafts 50, as shown in Figs. 12 and 14, is capable of being adjusted vertically to correspondingly raise or lower the pulleys 49 and 51ª relative to the top of the table 32 to compensate for variations in belt thickness. For this purpose, the bearing portions 39 and 40 are provided with circular holes 78 receiving the correspondingly shaped rotatable bushings 79 normally held in fixed relation by the set screws 79ª. The corresponding bushings 79 have eccentric bearings 80 through which the same is supported. The bushings 79 have flanged inner portions 81 provided with tool receiving holes 82 about the periphery thereof, and the shafts 50 are retained against axial movement by the collars 83. Upon rotation of the members 79, because of the eccentric shaft mounting, the elevation of the pulleys 42 and 51ª may be varied to position the belts 46 and 47 contiguous to the table 32 in flush relation thereto.

The control means 63 is disposed upon the ledge 61ª of the angle member 61 at a position contiguous to the chucks 26, and is actuated by the advance of the work upon conveyor 34 to start the operation of the machine as the work attains each of its successive nailing positions, said control means being reset upon each operation of the machine to be ready for the succeeding operation.

Figures 4, 5, 6:
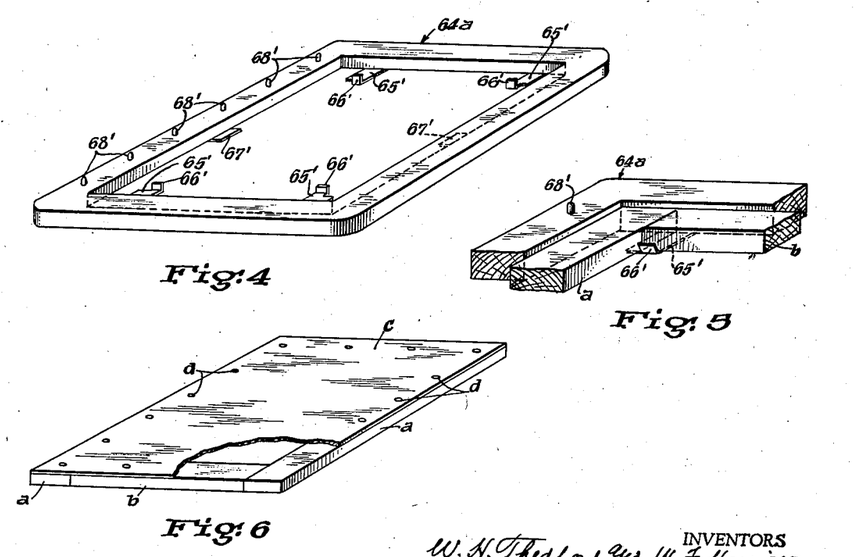
Fig. 4 is a perspective of the holder or frame for holding the work panel or box side with the parts of the panel in assembled relation.
Fig. 5 is a perspective of a corner portion of said holder or frame showing the engagement of the cleats with one of the supporting clips of the holder.
Fig. 6 is a perspective of one form of box side or panel in completed or finished state.

The machine is particularly adapted for nailing box sides or panels, such as that illustrated as one example in Fig. 6. The panel, as shown, comprises the longitudinal and transverse cleats a and b assembled as a frame in rectangular formation and to which is nailed the panel c. The nails, in the given example, are applied in a succession of six rows d considered longitudinally of the panel, the first and last rows each comprising four nails to the row, and the intermediate rows each comprising two nails to the row. The number of nails to a row is determined by the adjustment of the selective nail feed 13.

The panel parts a, b, c are supported in pre-assembled relation by a carrier or frame 64ª, as shown in Figs. 4 and 5, said frame being termed herein a "holder" or "jig." The frame 64ª is provided at the opposite ends with inwardly directed clips 65', preferably of thin metal, for supporting the end cleats b, and the ends of the longitudinal cleats a. The inner ends of the clips 65' are provided with upturned portions or tongues 66' for retaining the cleats b in position upon the clips, said tongues being offset relative to the longitudinal cleats a to allow the latter to extend past the tongues 66'. The cleats a are also preferably supported at intermediate points by flat clips 67'. When the cleats a and b are thus assembled, they become effectively locked in position, and the panel c is then disposed thereon. In actual practice, a number of such frames 64ª with the panel parts assembled therein, are rendered available to be successively conveyed through the machine to be operated upon, thereby insuring the continuous and substantially uninterrupted feed of successive panels into and from nailing position by the conveyor 34, and maintaining a desirable production rate. Each of the frames 64ª is provided at one, or both longitudinal sides thereof, with a longitudinal series of projections 68' serving as a series of means for successively actuating the controlling means 63. The devices or projections 68' upon each member 64ª correspond in number with the number of nailing operations to be performed upon the panel carried by said member, and are positioned relative to the lines of nailing for each panel, so that the travel of the jig and the panel carried thereby is stopped and the operation of the machine started as the panel attains each of its successive proper nailing positions.

Figure 3:
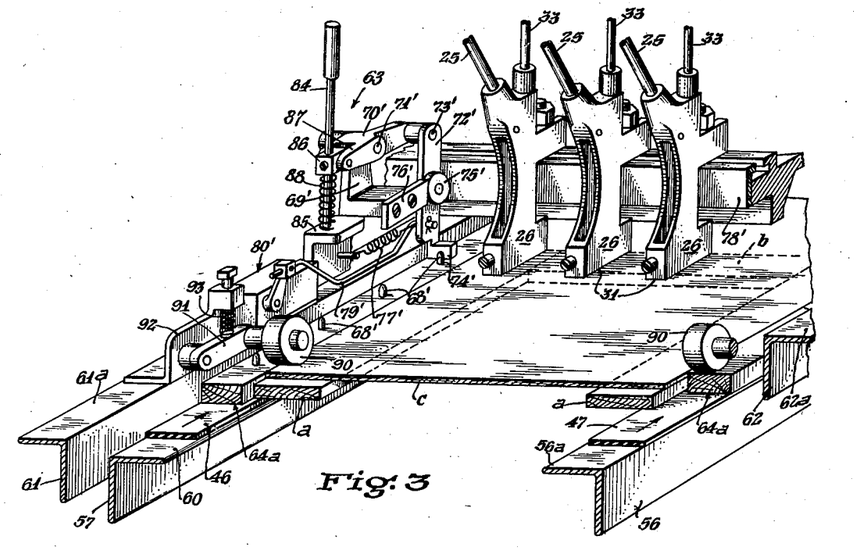
Fig. 3 is a perspective of a portion of the machine showing a part of the nailing mechanism and the control means for starting and stopping the operation thereof, parts being broken away and parts being in section.

The control mechanism 63 comprises an upright or standard 69' upon which the horizontally disposed arm 70' at an intermediate point 71' is pivoted. A member 72', constituting a trip, is pivotally connected at the upper end 73' thereof to one end of the arm 70' and depends therefrom. The member or trip 72' is provided with an inwardly directed finger 74' at the lower end thereof disposed in the path of the actuating devices 68' upon the frame or jig 64ª which is being advanced by the conveyor 34. The member 72' has an anti-friction roller 75' normally held in engagement with a stop 76' on the standard 69' by means of a spring 77'. Upon actuation of the trip 72' by a contiguous actuating device 68' which is being advanced by the conveyor, the trip 72' is swung rearwardly until the roller 75' engages, as shown in Figs. 3 and 15, the forward face 78' of the chuck carriage 27, which serves as a stop limiting the rearward movement of the arm 72', the latter then acting as a stop to prevent further movement of the jig 64ª with the conveyor 34. The actuation of the member 72' through a link connection 79' actuates the switch 80' in the circuit 81' of the solenoid 82' which controls the operation of the clutch means 83' (Fig. 7) for starting and stopping the operation of the nailing machine, as hereinafter more fully described.

The tripping member 72', upon actuation thereof by one of the devices 68', is reset for operation by the next succeeding device 68' by means of the vertical plunger 84 slidable in the bearing 85, and disposed in the path of travel of the cross-head 14 to be actuated thereby. The plunger 84 has secured thereto a collar 86 to which the bifurcated end 87 of the arm 70' is pivotally connected. A coil spring 88 is disposed about the plunger 84 between the bearing 85 and collar 86 to normally retain the plunger in its uppermost position. The lower end of the plunger 84 below the bearing 85 is provided with a head 89 for limiting the upward movement of the plunger under the action of the spring 88.

When found desirable, presser rollers 90 may be employed to hold the carrier or jig 64ª firmly in position on the conveyor 34 as the carrier or jig approaches the nailing position. Each roller 90 is journaled upon the outer end of an arm 91 pivoted at the other end thereof to the standard 92 mounted on the ledge 61ª or 62ª. The roller is held depressed and in engagement with the frame 64ª by the spring 93 interposed between the arm 91 and a portion of the standard 92.

Figure 7:
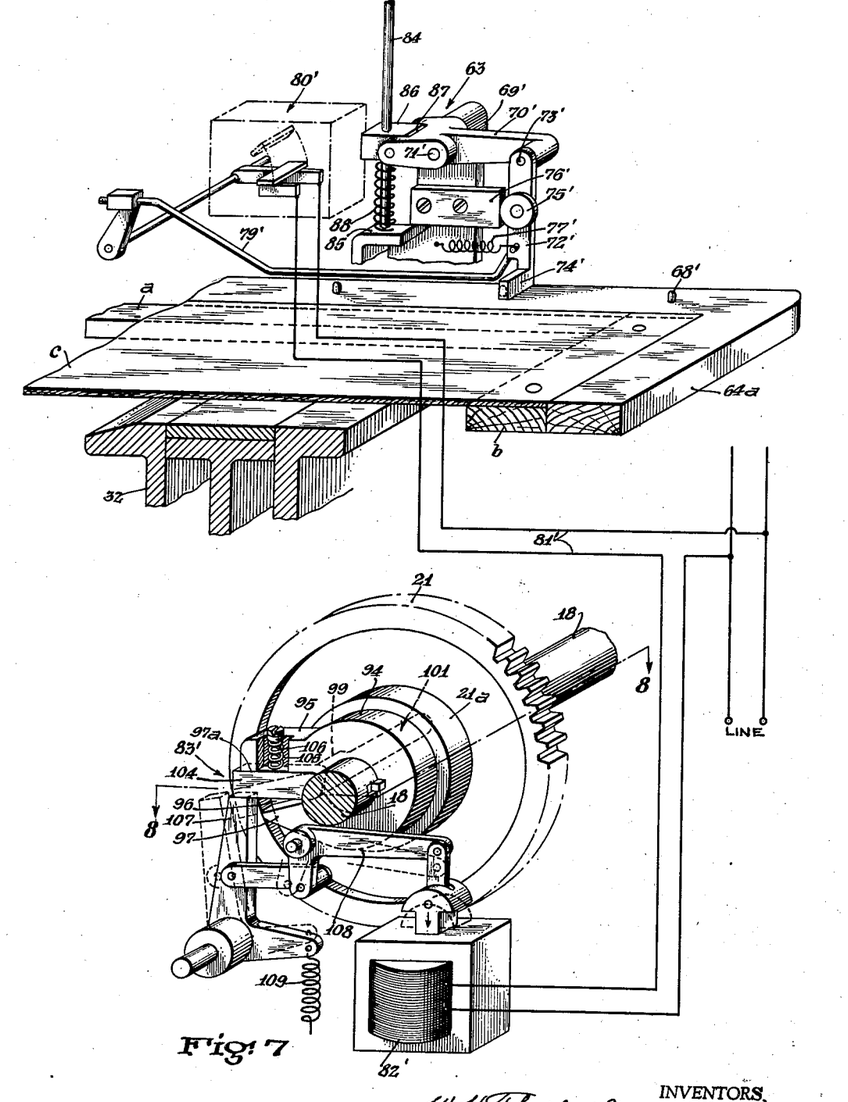
Fig. 7 is a detail perspective of the control mechanism, parts being in section, with the wiring diagram indicated therein.
Figures 8, 9, 10, 11:
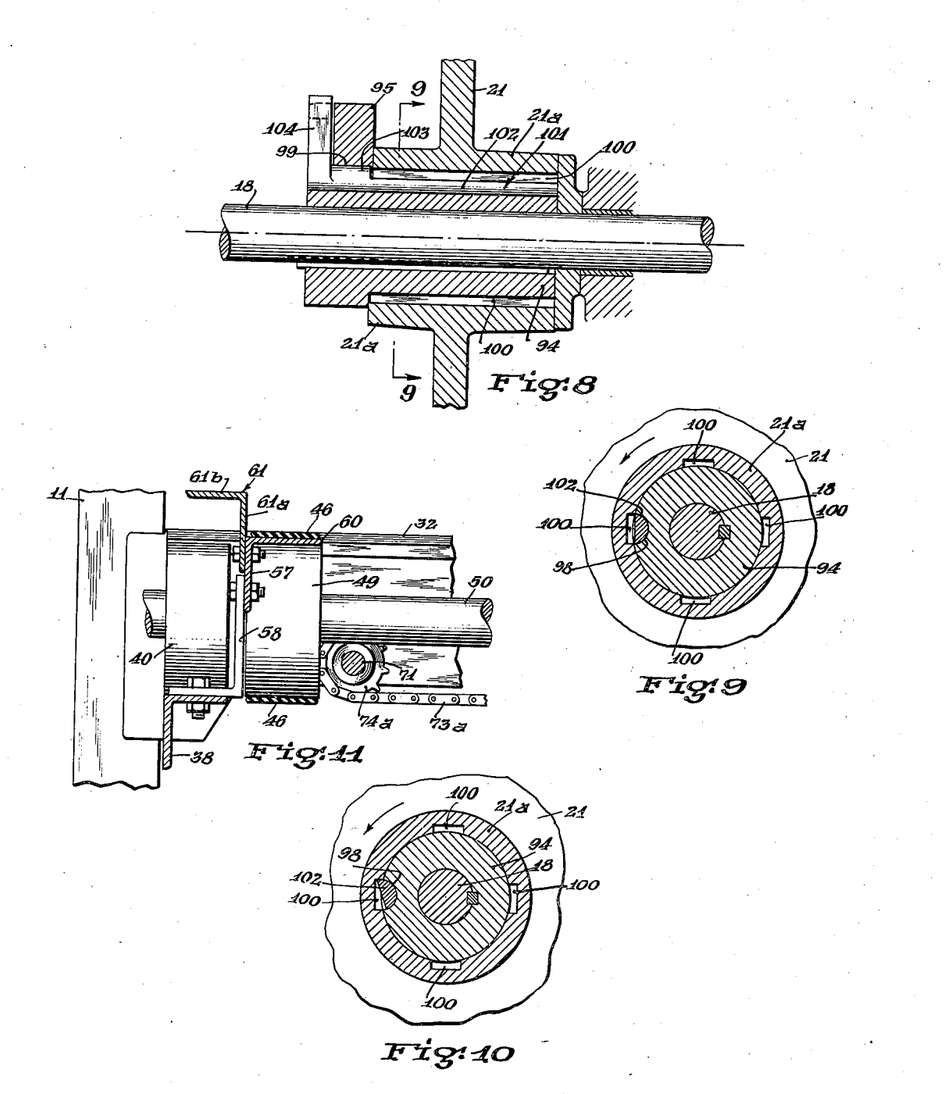
Fig. 8 is a detail horizontal section on the line 8—8 of Fig. 7.
Fig. 9 is a transverse section on the line 9—9 of Fig. 8, the clutch parts being shown in unlocked relation.
Fig. 10 is a similar view showing the clutch parts in locked relation.
Fig. 11 is a detail section on the line 11—11 of Fig. 2.

The clutching means 83' shown in Figs. 1, 7 and 8 to 10, comprises a male member or sleeve 94 keyed to the drive shaft 18. The hub 21 of the gear 21 constituting the female member is disposed about the member 94 for rotation relative thereto, the gear 21 being continuously operated from the shaft 19. The sleeve 94 beyond one end of the hub, is provided with a lateral extension 95 having in the outer portion thereof a V-shaped recess 96 which diverges radially outwardly, the lower portion 97 defining said recess being of reduced length, as shown in Fig. 7, relative to the upper portion 97ª. The sleeve 94 is provided with a longitudinal semi-circular recess 98 in the periphery thereof, which merges at the part 95 with a cylindrical bearing 99. The inner surface of the hub 21ª is provided with a plurality of longitudinal recesses 100, preferably of angular formation, any of which is adapted to register with the recess 98. The parts 94 and 21ª may be connected to effect rotation of the shaft 18 by means of a key member 101 having a semi-circular end portion 102 adapted to be retained, as shown in Fig. 9, in position completely filling said recess 98 and disconnected from the hub 21ª. The outer end of the key 101 comprises a cylindrical shank portion 103 in the bearing 99 and a radially extending finger 104 riding in the slot or recess 96 between the limits provided by the portions 97 and 97ª. The portion 97ª is provided with a recess 105 in which is disposed a coil spring 106 which normally urges the finger 104 to its lowermost position when the detent 107 is disengaged from the finger 104. The detent 107 is connected to the solenoid 82' by connection 108. When the solenoid is energized, the detent is swung outwardly from under the finger 104 to the position shown in broken lines. Thereupon, the finger 104 is moved rotatively to cause the key portion 102 to engage in one of the recesses 100, as shown in Fig. 10, to effect rotation of the shaft 18 by rotation of the gear 21. The detent 107 is returned to normal locking position by a spring 109 after the solenoid is deenergized to cause disconnection of the parts at the completion of a single cycle of operation, as hereinafter more fully described.

Figures 19, 20:
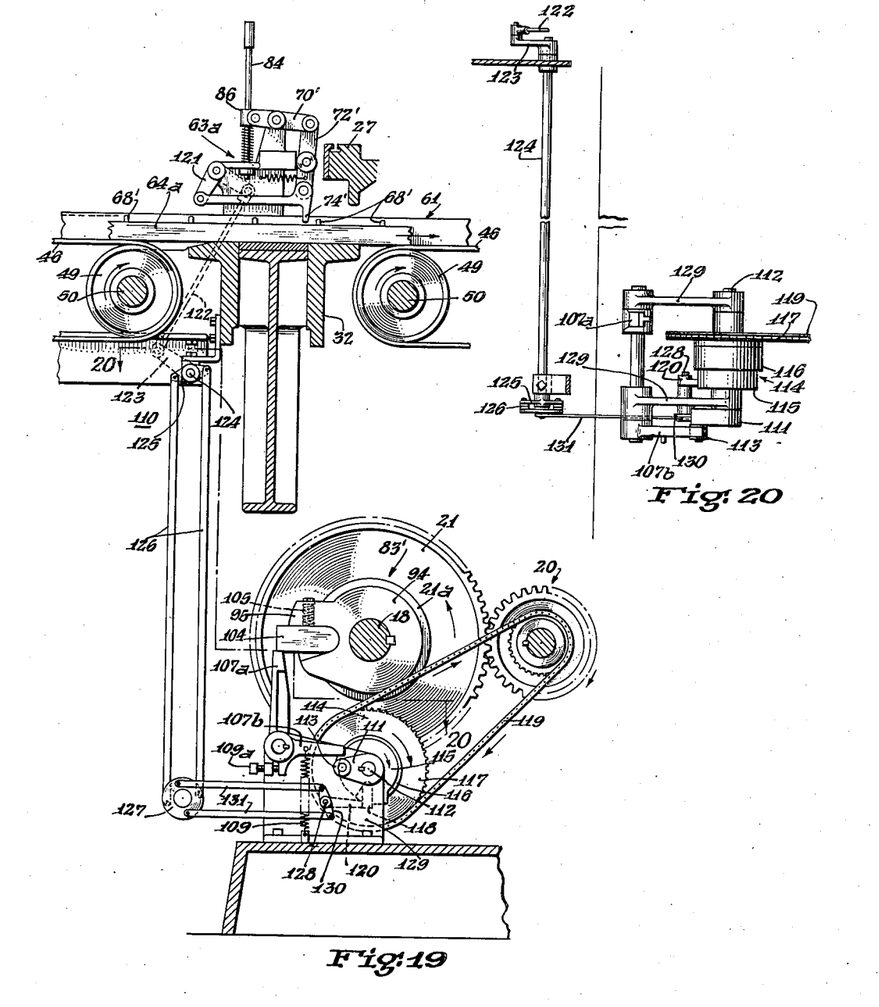
Fig. 19 is a detail side elevation of a modified form of controlling means, parts of the machine being shown in section.
Fig. 20 is a horizontal section thereof taken on the line 20—20 of Fig. 19.

In Figs. 19 and 20 is illustrated a modification in which the clutch means 83' is thrown into and out of operation by mechanically operated means instead of by the electrically operated means shown in Fig. 7. In said modified form the controlling means 63ª is modified to effect its control, when actuated by the lugs 68' on the frame 64ª, through a mechanical system 110. In other respects the construction and mode of operation of the control mechanism 63ª is substantially the same as that shown in Fig. 7 and described in connection therewith.

The clutch mechanism 83' shown in Figs. 19 and 20 is substantially the same as that shown in Figs. 7, 8 and 9, and above described, and it is normally retained in inoperative or unlocked position by engagement of the detent 107ª with the finger 104, said detent 107ª being normally retained against the stop 109ª by a spring 109 secured at one end to the arm 107ᵇ of the detent 107ª, and at its opposite end to the frame. In the form of the invention shown in Figs. 19 and 20, the detent 107ª is actuated mechanically by an arm 111 secured to the shaft 112, the arm having an anti-friction roller 113 thereon adapted, when the shaft 112 is rotated, to engage the arm 107ᵇ and disengage the detent 107ᵃ, thereby throwing in the clutch 83'.

A pilot clutch 114 associated with the shaft 112 is substantially the same in construction and mode of operation as the clutch 83'. The clutch 114 includes the male member 115, the female member 116 having the sprocket 117 and locking key 118. The sprocket 117 is rotated continuously by a chain 119 driven from the transmission 20 for driving the gear 21. The key 118 is normally retained by a detent 120 in unlocked position to prevent actuation of the shaft 112, the detent 120 being released by operation of the mechanical system 110 upon actuation of the control 63ᵃ.

The system 110 comprises a bell-crank 121 having one arm thereof connected by a link 122 with arm 123 on one end of shaft 124. A cross-arm 125 is secured to the opposite end of shaft 124, a pair of links 126 depending pivotally from the arm 125. The lower ends of the links are pivotally connected to a member 127. The stop finger 120 is secured to one end of a short shaft 128 journaled in the support 129. The opposite end of the shaft 128 has a cross-arm 130. A pair of links 131 disposed in substantially right angular relation to the links 126 are pivotally connected at one pair of contiguous ends to member 127 at points diagonal to pivotal connections of links 126 thereto, and at the opposite pair of ends to cross-arm 130. The parallel link system 126—131 provides a pantograph mechanism which allows the table 32 on which the shaft 124 is mounted to be raised or lowered without affecting the position of the detent 120.

In the modification of the invention last described, power is continuously applied to the sprocket 117 for rotating the same while loose relative to the shaft 112. Upon actuation of the control 63ᵃ and resulting movement of the connection 110, the detent 120 is swung downwardly to disengage the key 118, the latter then locking the parts 115 and 116 together to cause rotation of the shaft 112. The detent 107ᵃ is then swung by the arm 111 out of engagement with the key portion 104 of the main clutch 83 to cause operation of the nailing machine. The detent 107ᵃ returns to normal position as soon as the arm 111 clears the same to again engage the portion 104 at the completion of a revolution to throw out the clutch 83 and stop the machine. When the control 63ᵃ resets upon actuation of plunger 84 by the cross-head, the detent 120 returns to normal position to engage the key 118 and throw out the clutch 114 at the completion of a single revolution thereof.

The operation of the machine is as follows: The table 32 is properly adjusted in elevation by means of the actuator 32ᵃ (Fig. 1) in accordance with the overall thickness of the box side or panel to be nailed so as to allow the work to clear the chucks as the work is advanced through the machine. The conveyor sections are then rendered horizontal with relation to the table 32 by rotating the hand wheels 44ᵃ of the several adjustable standards or supports 44. By rotating the wheel 70, the spacing between the belt 46 and guide 61, and belt 47 and guide 62, may be adjusted to correspond with the width of the frames 64ᵃ required for the particular work to be nailed. The work to be operated upon is then assembled in any desirable or convenient number of frames 64ᵃ to be successively fed to and advanced through the machine.

The frames are placed upon the conveyor belts 46 and 47 of the forward conveyor section 34 to be advanced into nailing position by the movement of said belts, which are continuously actuated from the motor 64. The frames 64ᵃ rest upon the belts 46 and 47 in frictional engagement therewith, the weight of the frame and panel therein and the frictional properties of the belts being coordinated to insure free movement of the frames 64ᵃ with the belts into and out of nailing position, and to permit of the stopping of each frame at the nailing position without interrupting the operation of the conveyor.

As the frame 64ᵃ is advanced, the actuators or pins 68' therein successively engage and actuate the arm 72' of the control 63 to throw in the clutch 83' and start the operation of the nailing machine. The sequence of this control is illustrated in Figs. 15 to 18. As shown in Fig. 15, when a pin 68' engages the arm 72', the arm is swung rearwardly into engagement with the chuck carriage 27 which prevents temporarily further movement of the frame 64ᵃ with the conveyor. The actuation of the arm 72' closes the switch 80' to actuate the solenoid 82' serving to throw in the clutch 83' to start the machine operation, or, as shown in Figs. 19 and 20, the actuation of the arm 72' may be caused to operate the pilot clutch 114 for starting the operation of the nailing mechanism. As the cross-head 14 starts to descend, the chuck carriage 27 lowers to bring the chucks 26 in engagement with the work, as shown in Fig. 18. The cross-head in its down movement compresses the spring 30 so that sufficient pressure is exerted on the work by the chucks to hold the frame 64ᵃ stationary during the nailing operation. After the chucks 26 become effective for holding the frame 64ᵃ, as shown in Fig. 16, the cross-head 14, upon continued movement, actuates the plunger 84 to raise the arm 72' out of engagement with the pin 68', the arm then being swung by spring 77' into its advanced position. Upon return of the arm 72' to advanced position, the solenoid 82' deenergizes and the detent 107 (or detent 120) is returned to position for engaging the finger 104 (or finger 118) upon the completion of a single revolution of the gear 21 to throw out the clutch 83' and stop the machine upon the completion of the nailing operation. Upon the completion of the down stroke of the cross-head, the nailing plungers 33 have been actuated to drive the nails into the work. Upon the return movement of the cross-head, as shown in Fig. 17, the plunger 84 is released to allow the arm 72' to swing downwardly into the position to be actuated by the next succeeding pin 68' on the frame. As the cross-head attains its uppermost position, the chucks 26 release the work and allow the conveyor to continue the advance of the frame to the next nailing position, whereupon the control 63 is again actuated. Upon the completion of the several nailing operations to be performed upon the work in any of the frames 64ᵃ, the conveyor section 36 at the discharge side of the machine is effective for moving the frame 64ᵃ and work carried thereby from the machine.

By means of our invention, we are able to advance or feed the work through the machine in a single line of direction without reliance upon the skill and attention of the operator, such as is required when the work must be variously positioned for nailing by manual manipulation thereof. We thus obtain efficiency in operation and increased production over manual methods heretofore employed for presenting the work to the nailing mechanism.

Further, by means of the mechanism embodying our invention, the work is pre-assembled in frames or jigs and advanced into nailing position by a continuously moving conveyor, and said jig or frame is provided with means for actuating at each of the required nailing positions a control for causing a complete cycle of operation of the machine, said control rendering effective means to hold the frame and the work carried thereby stationary relative to the constantly moving conveyor in each of the several nailing positions thereof until each nailing operation is completed, whereupon the operation of the machine or nailing mechanism is automatically interrupted and the frame released to allow further advance thereof on the conveyor, and the movement of the next succeeding frame into nailing position.

Having thus described our invention, what we claim and desire to secure by Letters Patent is:

1. A machine of the character described comprising a nailing mechanism including a vertically reciprocable cross-head and a chuck support carried thereby for movement relative thereto and constituting presser means for the work, means for actuating said nailing mechanism, a constantly travelling conveyor, a work carrier provided with actuating devices and adapted to be advanced by the conveyor into nailing position below said nailing mechanism, means associated with said actuating means operable to start the operation of said actuating means and interrupt said operation upon the completion of a cycle of operation of the nailing mechanism, a vertically swinging support disposed below said cross-head, means pivotally depending therefrom disposed in the path of said actuating devices upon the work carrier to be engaged and actuated thereby for operating said last-named means to start operation of said nailing mechanism, and for preventing movement of said carrier with the conveyor, and means operated by said cross-head after said presser means engages the carrier for swinging said support to disengage said last-named means from said carrier and cause the same to return to its initial position for the next succeeding operation.

2. A machine of the character described comprising nailing mechanism including a reciprocable cross-head, a chuck support carried thereby for movement relative thereto and a spring interposed between said cross-head and said chuck support and adapted to be compressed by said cross-head to increase the pressure exerted by said chuck support on the work to be nailed, a work carrier, a continuously operating belt conveyor for advancing said carrier into nailing position below said chuck support, means for actuating said nailing mechanisms, means for throwing said actuating means into and out of operation, control means actuated by said carrier for starting the operation of said nailing means and for preventing movement of the carrier until the chuck support becomes effective to hold the carrier, and means actuated by said cross-head for causing the controlling means to disengage said carrier and return to normal position.

3. A machine of the character described comprising nailing mechanism, a work carrier having actuating devices thereon, and adapted to be advanced into position below the nailing mechanism, means for actuating said nailing mechanism, means for throwing said actuating means into and out of operation, means for controlling said last-named means including a support, a centrally pivoted arm on the support, a member pivoted at one end to one end of said arm and extending downwardly into the path of said actuating devices on said carrier, a spring for retaining said member in its advanced position in engagement with a portion of said support, means serving to limit the movement of said member in the opposite direction, and a spring controlled plunger slidably mounted in said support and pivotally connected to said first-named arm at the opposite end thereof in position to be actuated by said nailing mechanism.

4. A machine of the character described comprising nailing mechanism including a vertically reciprocable cross-head, a chuck support carried thereby for movement relative thereto, and a spring interposed between said cross-head and said chuck support and adapted to be compressed by said cross-head to increase the pressure exerted by said chuck support on the work to be nailed, a work carrier, a continuously operating conveyor belt for advancing said carrier into nailing position below said chuck support, means for actuating said nailing mechanism, means for throwing said actuating means into and out of operation, and controlling means therefor including a fixed support in spaced relation to said chuck-support, a centrally pivoted arm on the support, a member pivoted at one end of said arm between said supports for limited movement therebetween and extending downwardly into the path of said carrier, a spring for retaining said last-named member in its advanced position in engagement with the fixed support, a plunger below said cross-head to be actuated thereby, said plunger being guided vertically in said support and pivotally connected to the other end of said arm, and a spring for normally maintaining said plunger projected.

5. A machine of the character described comprising a nailing mechanism including a vertically reciprocable cross-head and a chuck support carried thereby for movement relative thereto into engagement with the work, a work carrier having actuating devices thereon at points corresponding to the nailing positions, a continuously operating conveyor for advancing said carrier into nailing position below said nailing mechanism, means for actuating said nailing mechanism, means for throwing said actuating means into and out of operation, means for controlling said last-named means including a member disposed in the path of said actuating devices in advance of said chuck support to be engaged by said devices for actuating said controlling means, said member upon engagement thereof with said chuck-support serving temporarily to prevent movement of the carrier with the conveyor, and means below said cross-head in the path thereof and actuated thereby after said chuck-support becomes effective to hold the carrier for disengaging said member from said carrier and restoring said controlling means to its initial position for the next succeeding operation.

6. A machine of the character described comprising a nailing mechanism including a vertically reciprocable cross-head and a chuck-support carried thereby for movement relative thereto and adapted to engage the work, a work carrier, a conveyor for advancing said carrier into nailing position below said nailing mechanism, means for actuating said nailing mechanism, means associated with said actuating means operable to start the operation thereof and to interrupt said operation upon completion of a cycle of operation of the nailing mechanism, a fixed support below said cross-head in advance of said chuck-support at the side of the conveyor, a centrally pivoted arm on said fixed support, a spring-returned member pivoted at one end to one end of said arm and extending downwardly between said supports into the path of said carrier to be actuated thereby for controlling said starting means for the actuating means, said member, upon actuation thereof, engaging a stop to temporarily prevent movement of the carrier, and means disposed in the path of said cross-head and engaged thereby, after said chuck-support engages the carrier, for swinging said arm to move said member upwardly out of engagement with the carrier and to restore said member to operative position upon the return movement of the cross-head.

7. A machine of the character described comprising a nailing mechanism, a clinching table disposed below said mechanism, conveyor sections at the opposite sides of said table each including longitudinally extending lateral members connected at the inner ends thereof to said table, a transverse actuating shaft journaled in said members at the inner ends thereof, a guide shaft connecting said members at the outer ends thereof, a longitudinally extending intermediate member slidably supported upon said actuating shaft and said guide shaft, endless conveyor belts carried by one of said lateral members and said intermediate member, a driving connection between said actuating shafts, means for adjusting said intermediate members, and vertically adjustable means at the outer ends of said lateral members for supporting the outer ends of said conveyor sections.

8. A machine of the character described comprising a nailing mechanism, a clinching table disposed below said mechanism, conveyor sections at the opposite sides of said table each including longitudinally extending horizontal lateral members connected at the inner ends thereof to said table, means for supporting said members at the outer ends thereof, a transverse drive shaft journaled in said sections at the inner ends thereof, a transverse guide shaft connecting said members at the outer ends thereof, a drum secured to said actuating shaft contiguous to one of said lateral members, a drum journaled in said lateral member at the outer end thereof, an endless conveyor belt disposed about said drums, a longitudinally extending intermediate horizontal member slidably supported by said actuating shaft and said guide shaft, a drum journaled in said last-named member and slidably keyed to said actuating shaft, a drum journaled in said last-named member at the outer end thereof, an endless conveyor belt disposed about said last-named drums, a driving connection between said actuating shafts, and actuating means for adjusting said intermediate members.

9. A machine of the character described comprising a nailing mechanism, a clinching table disposed below said mechanism, conveyor sections at the opposite sides of said table each including longitudinal lateral members connected at the inner ends thereof to said table, transverse actuating shafts journaled in said sections at the inner ends thereof, guide shafts connecting each pair of said members at the outer ends thereof, a drum secured to each of said actuating shafts contiguous to a lateral member, a drum journaled on each of said lateral members at the outer end thereof, an endless conveyor disposed about each pair of said drums, longitudinally extending intermediate members slidably supported by said actuating shafts and said guide shafts, a drum journaled in each of said last-named members and slidably keyed to said actuating shafts, a drum journaled on each of said last-named members at the outer end thereof, an endless conveyor disposed about each pair of last-named drums, means connected to said intermediate members at the opposite ends thereof for moving the same to vary the spacing between the conveyors, and a common actuating means for said several last-named means.

10. A machine of the character described comprising a nailing mechanism, a clinching table disposed below said mechanism, conveyor sections at the opposite sides of said table including horizontal frames, endless conveyors supported by said frames at one side thereof, longitudinally extending members slidably mounted at the ends thereof upon said frames, endless conveyors supported by said longitudinal members, a longitudinally extending rotatable actuating shaft having drive members thereon at points corresponding to the inner and outer ends of said frames at one side, idler members upon said frames at corresponding points at the opposite side, and belts disposed about said pairs of members and connected to the ends of said slidably mounted members for actuating the same upon rotation of said shaft.

11. A machine of the character described comprising a nailing mechanism, a clinching table disposed below said mechanism, conveyor sections at the opposite sides of said table each including longitudinal lateral members, a transverse actuating shaft journaled therein at the inner ends and a guide shaft connecting the same at the outer ends, a longitudinally extending intermediate member slidably supported by said actuating shaft and said guide shaft, an endless conveyor supported by a lateral member of each conveyor section and actuated by said drive shaft, an endless conveyor supported by each slidable member and actuated by said drive shaft, a driving connection between said shafts, a longitudinally extending rotatable actuating shaft at one side of said conveyor section having sprockets thereon at points corresponding to the inner and outer ends of said conveyor sections, idler sprockets upon said conveyor sections at corresponding points at the opposite side, and chain belts disposed about said pairs of sprockets and connected to the ends of said slidably mounted members.

12. A machine of the character described comprising a nailing mechanism, a clinching table disposed below said mechanism, conveyor sections at opposite sides of said table each including longitudinally extending lateral members connected at the inner ends thereof to said table, one of said members including a belt supporting portion and a guide portion, a transverse drive shaft journaled in said members at the inner ends thereof, a transverse guide shaft connecting said members at the outer ends thereof, a drum secured to said actuating shaft contiguous to one of said lateral members, a drum journaled in the lateral member at the outer end thereof, an endless conveyor belt disposed about said drums upon said supporting portion, a longitudinally extending intermediate member including a belt supporting portion and a guide portion slidably supported by said drive shaft and said guide shaft, a drum journaled in said last-named member and slidably keyed to said drive shaft, a drum journaled in said last-named member at the outer end thereof, an endless conveyor belt disposed about said last-named drums upon said supporting portion, a driving connection between said actuating shafts, sprocket-chain mechanism connected to each end of both intermediate members, and common actuating means therefor.

13. A mechine of the character described comprising a nailing mechanism, a clinching table disposed below said mechanism, a conveyor section at one side of said table including a transversely extending actuating shaft having a drum thereon at the inner end of said conveyor section, an idler drum at the outer end of said conveyor section, a conveyor belt disposed about said drums, and members on said conveyor section having eccentric openings therein constituting bearings receiving said actuating shaft, said members being rotatively adjustable for varying the elevation of said shaft to make said belt substantially flush with said table.

WILLIAM H. THEDFORD.
WILLIAM F. HARRIETT.